US008967511B1

(12) United States Patent
Lo

(10) Patent No.: US 8,967,511 B1
(45) Date of Patent: Mar. 3, 2015

(54) SLIDABLE COVER MECHANISM OF A PAPER SHREDDER

(71) Applicant: Emily Lo, New Taipei (TW)

(72) Inventor: Emily Lo, New Taipei (TW)

( * ) Notice: Subject to any disclaimer, the term of this patent is extended or adjusted under 35 U.S.C. 154(b) by 44 days.

(21) Appl. No.: 13/691,781

(22) Filed: Dec. 1, 2012

(51) Int. Cl.
*A01F 21/00* (2006.01)
*B02C 25/00* (2006.01)

(52) U.S. Cl.
CPC .................................... *B02C 25/00* (2013.01)
USPC ........................ 241/37.5; 241/100; 241/285.2

(58) Field of Classification Search
CPC .............. B02C 2018/168; B02C 18/16; B02C 2018/0023; B02C 2018/0046
USPC ........... 241/37.5, 100, 236, 285.2; 220/254.1, 220/254.9, 354.1, 345.4; 232/15, 16, 44
See application file for complete search history.

(56) References Cited

U.S. PATENT DOCUMENTS 7,040,559 B2 * 5/2006 Matlin et al. .................... 241/36
7,213,780 B2 * 5/2007 Chen ............................ 241/100
7,344,096 B2 * 3/2008 Matlin et al. .................... 241/36
7,618,001 B2 * 11/2009 Aries et al. ................... 241/37.5
7,654,481 B2 * 2/2010 Huang ......................... 241/37.5
2006/0157601 A1 * 7/2006 Matlin et al. .................. 241/100
2008/0169369 A1 * 7/2008 Wang ........................... 241/37.5

FOREIGN PATENT DOCUMENTS

CN 202778626 U * 3/2013 ............. B02C 18/00

* cited by examiner

*Primary Examiner* — Shelley Self
*Assistant Examiner* — Leonel Vasquez
(74) *Attorney, Agent, or Firm* — Pro-TECHTOR International Services; Ian Oglesby

(57) ABSTRACT

The present invention provides a slidable cover mechanism of a paper shredder, wherein an upper cover of the paper shredder is provided with a face cover sliding along an upper surface of the upper cover, two sides at a bottom of the upper cover are provided respectively with a first chute and a second chute, two sides at a bottom of the face cover are provided with guiding pillars, the guiding pillars are disposed respectively in the first chute and the second chute, a first pressing plate and a second pressing plate are connected respectively above the first chute and the second chute on the guiding pillars, an exterior side of the first chute is provided with a micro-switch at a bottom of the upper cover, and an extension arm is provided between a side of the first pressing plate and the micro-switch.

10 Claims, 11 Drawing Sheets

SLIDABLE COVER MECHANISM OF A PAPER SHREDDER

BACKGROUND OF THE INVENTION a) Field of the Invention

The present invention relates to a slidable cover mechanism of a paper shredder.

b) Description of the Prior Art

Referring to FIG. 1, it shows a conventional paper shredder wherein paper is fed in vertically and FIG. 2 shows another conventional paper shredder having a blocking board structure, wherein paper is fed in obliquely. Although these two kinds of paper feed-in methods have all been carried out with safety certification in design, some problems still exist when using the paper shredders. As the paper entrance is opened, foreign objects may inevitably fall into the paper shredder, which results in damage to a user's possession, thereby causing an unnecessary loss. In addition, the objects (hard objects, such as coins) that fall into the paper shredder may cause damage to the paper shredder itself.

SUMMARY OF THE INVENTION

Accordingly, the primary object of the present invention is to provide a slidable cover mechanism of a paper shredder, preventing the foreign objects from dropping into the paper shredder to cause an unnecessary loss to the user and protecting the paper shredder itself.

In comparison to the existing technology, the present invention utilizes a slidable face cover on an upper cover of a paper shredder, so as to effectively prevent from hurting people, avoid the foreign objects from dropping at the paper entrance of the paper shredder and keep from damaging the paper shredder. A bottom of the face cover is disposed with pressing plates and an extension arm, so that after the face cover has been pushed open, the extension arm can be in touch with a micro-switch to energize the paper shredder, thereby achieving the effects of energy saving and environmental protection.

To enable a further understanding of the said objectives and the technological methods of the invention herein, the brief description of the drawings below is followed by the detailed description of the preferred to embodiments.

DETAILED DESCRIPTION OF THE PREFERRED EMBODIMENTS

Figure 1:
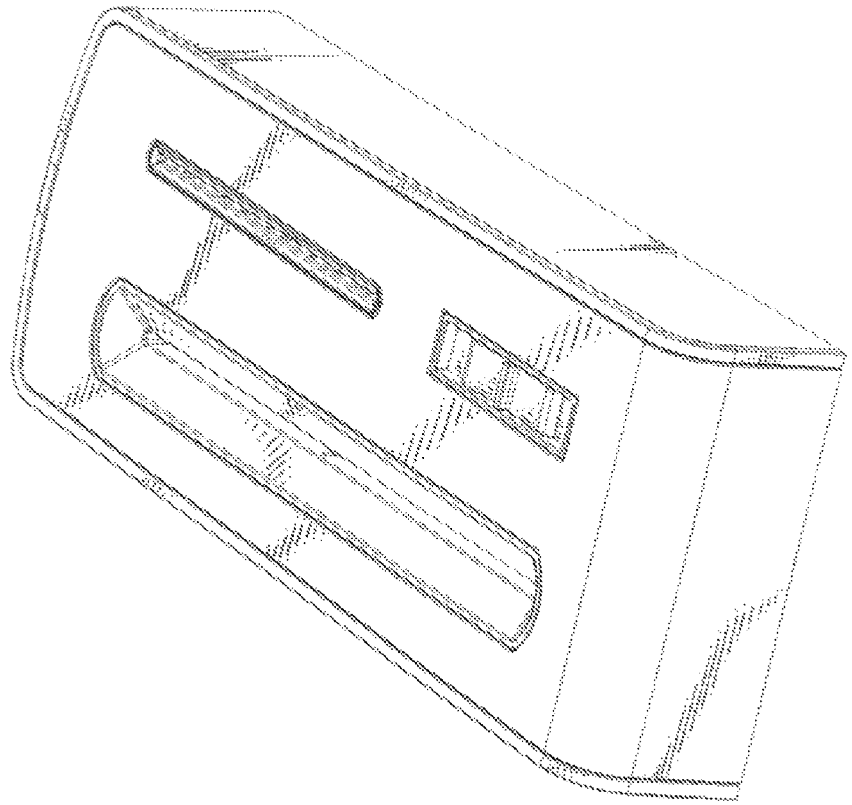
FIG. 1 (PRIOR ART)
FIG. 1 shows an external view of an embodiment of a conventional product.
Figure 2:
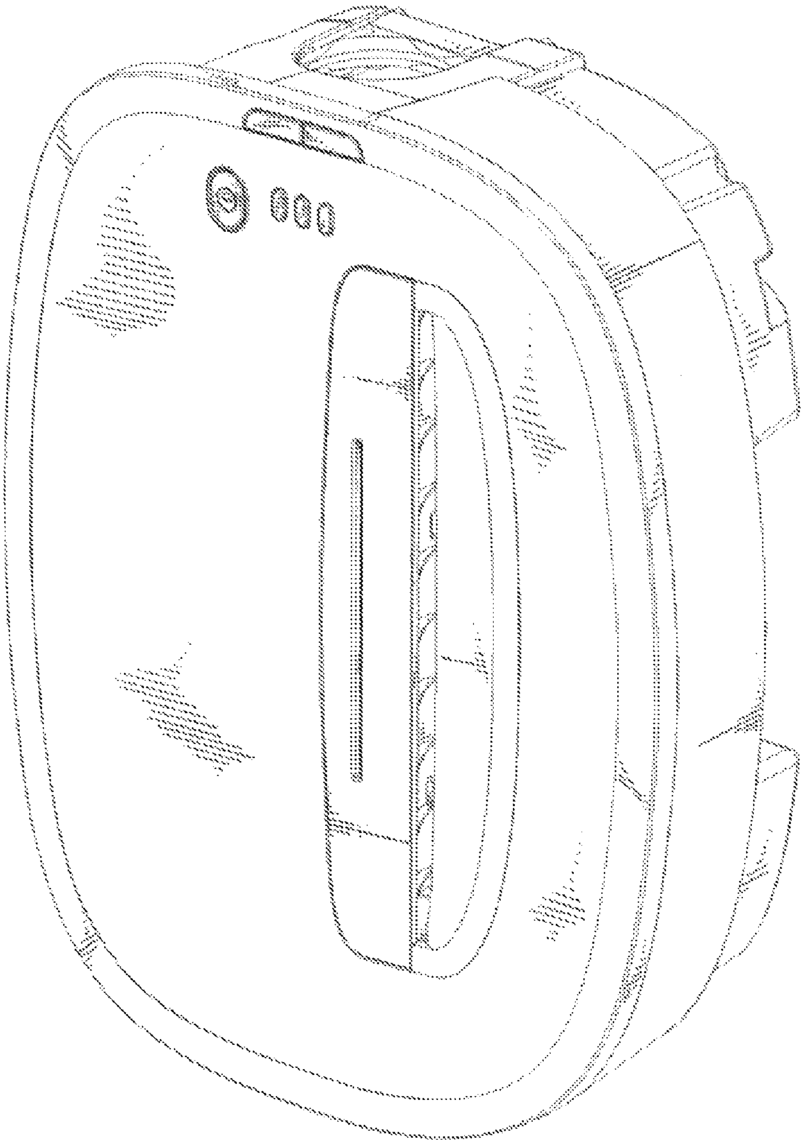
FIG.2 (PRIOR ART)
FIG. 2 shows an external view of another embodiment of a conventional product.

Referring to FIG. 1 and FIG. 2, in the existing paper shredders, paper is fed in vertically or inserted in obliquely with a blocking board.

However, both of these two methods exist with a safety concern that clothes or ties can be easily entrained into the paper shredders, causing danger to people.

Figure 3:
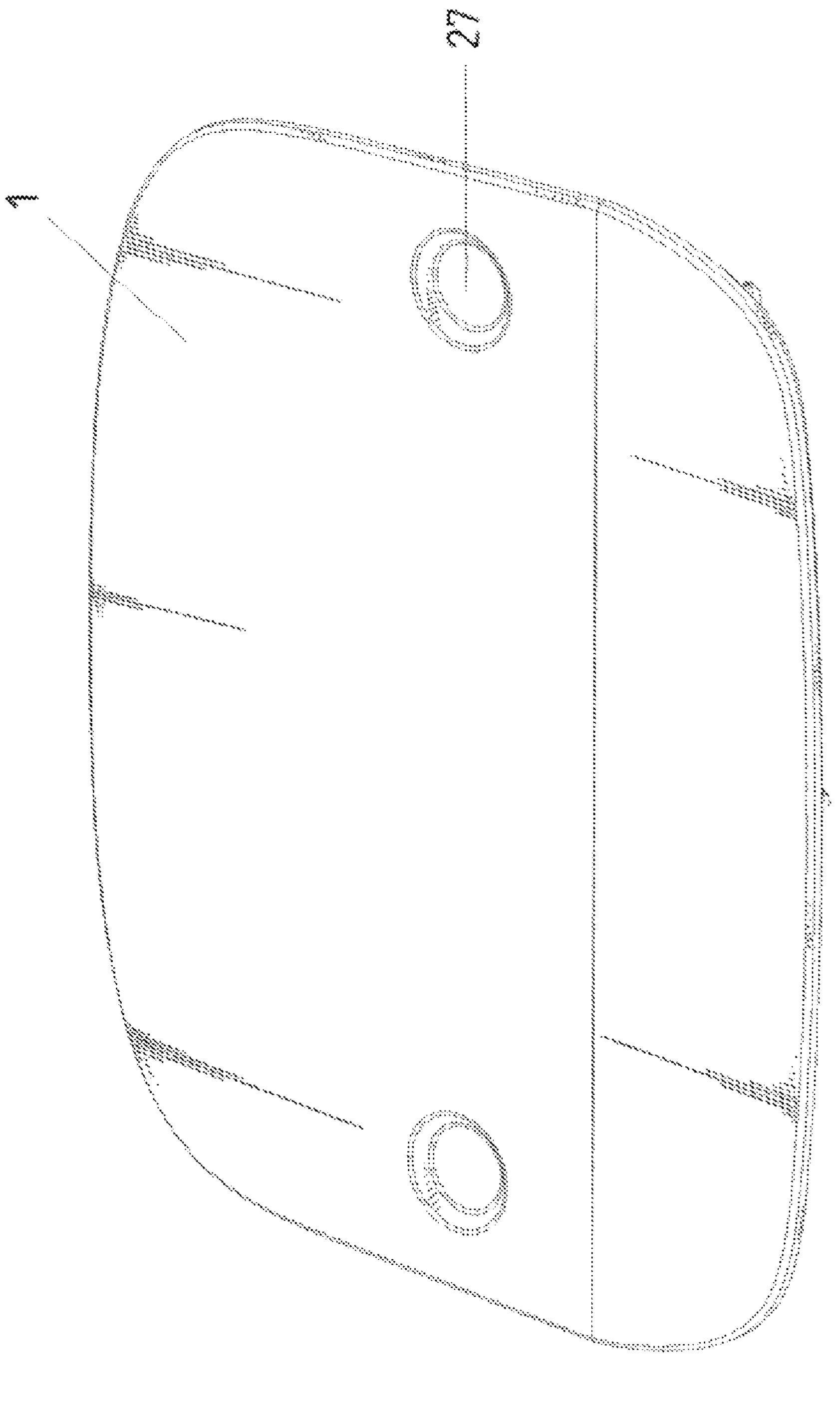
FIG. 3 shows an external view of the present invention when being closed.
Figure 4:
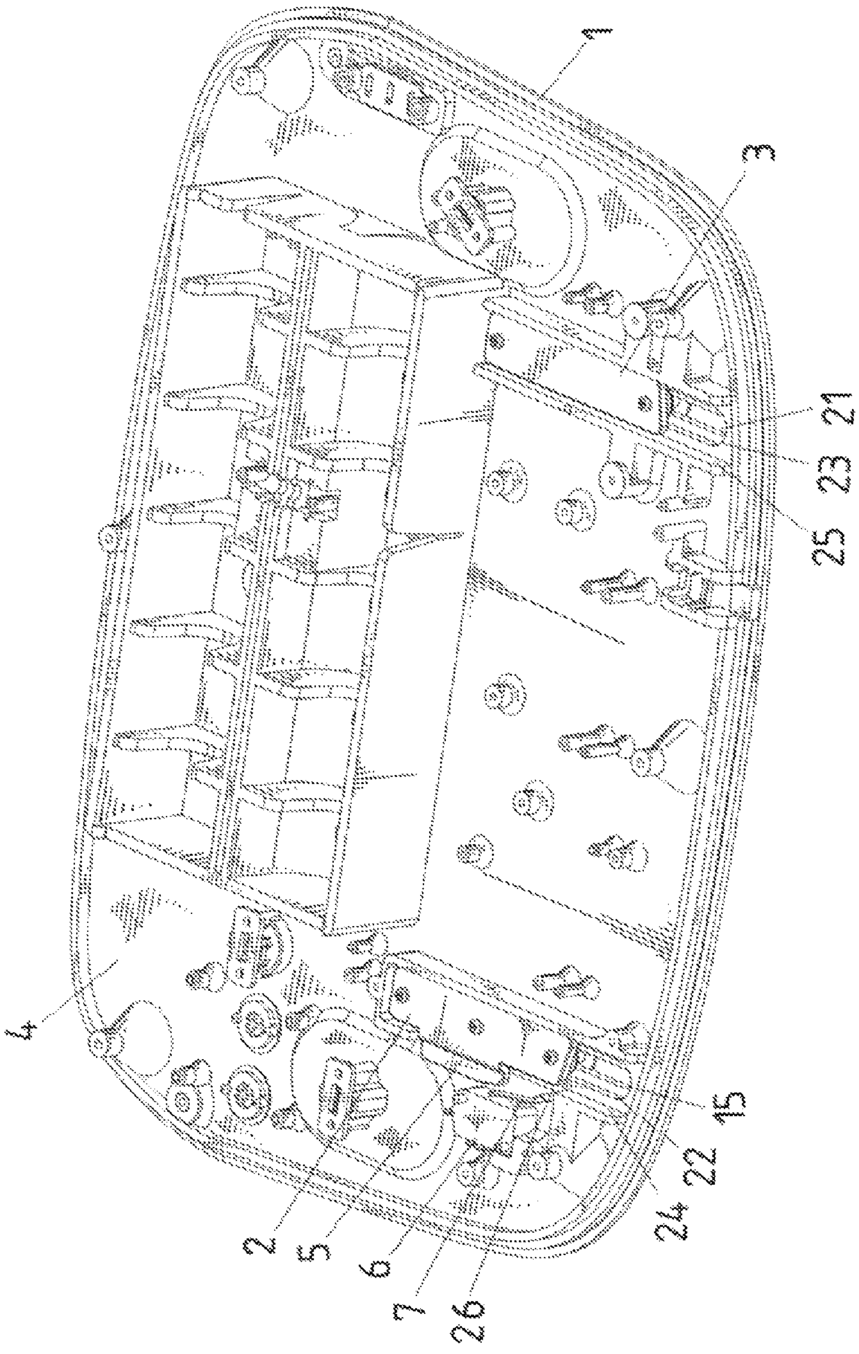
FIG. 4 shows a bottom schematic view of a first embodiment of the present invention.
Figure 5:
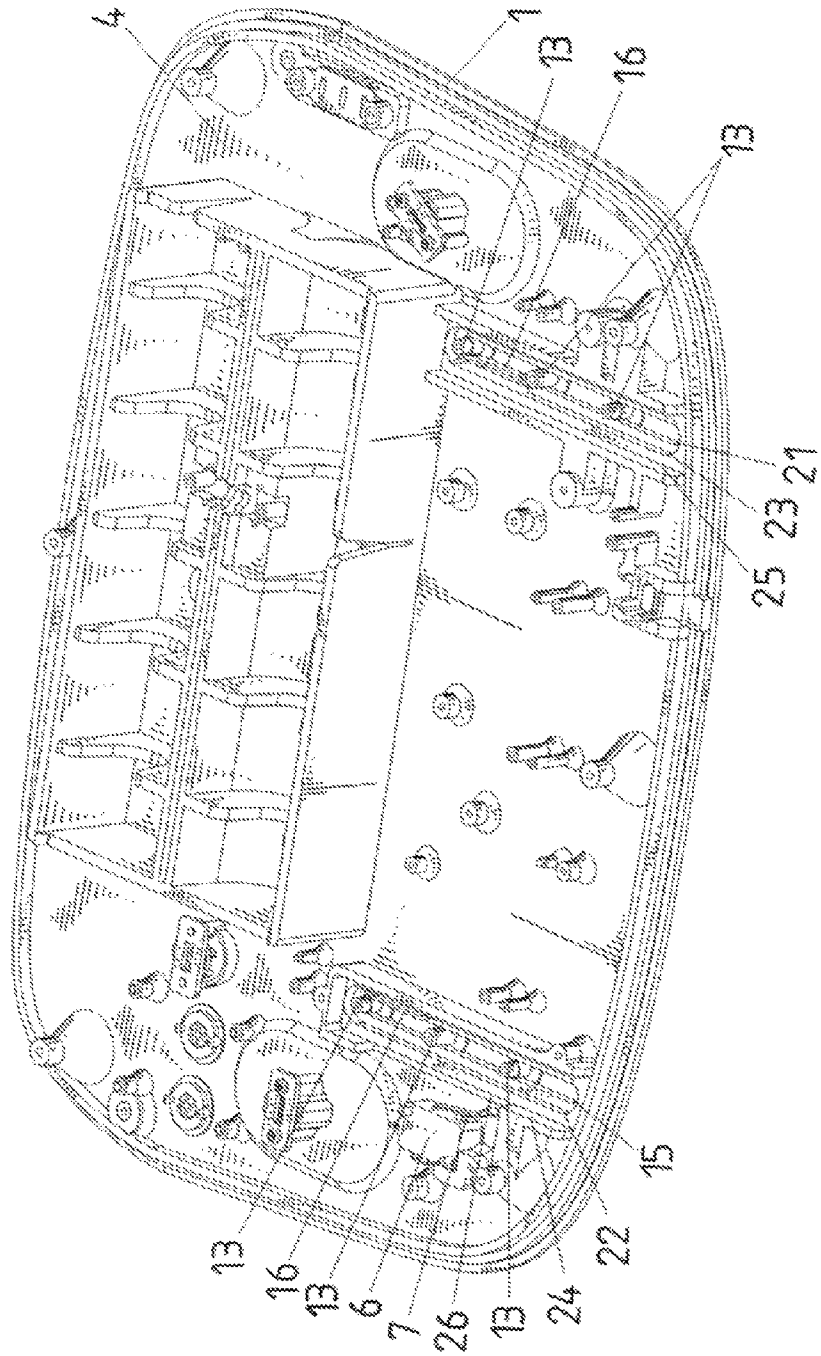
FIG. 5 shows a bottom schematic view of a second embodiment of the present invention.
Figure 9:
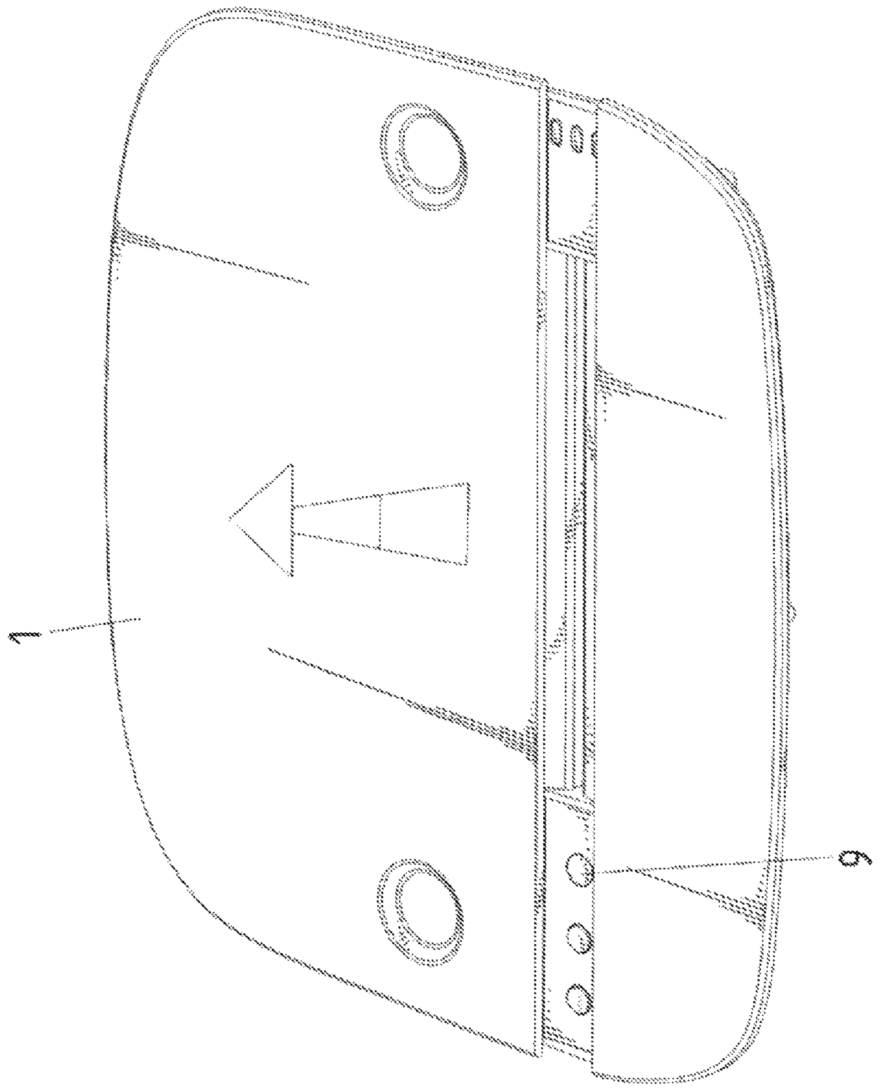
FIG. 9 shows an external view of the present invention when face cover that is pushed open.
Figure 10:
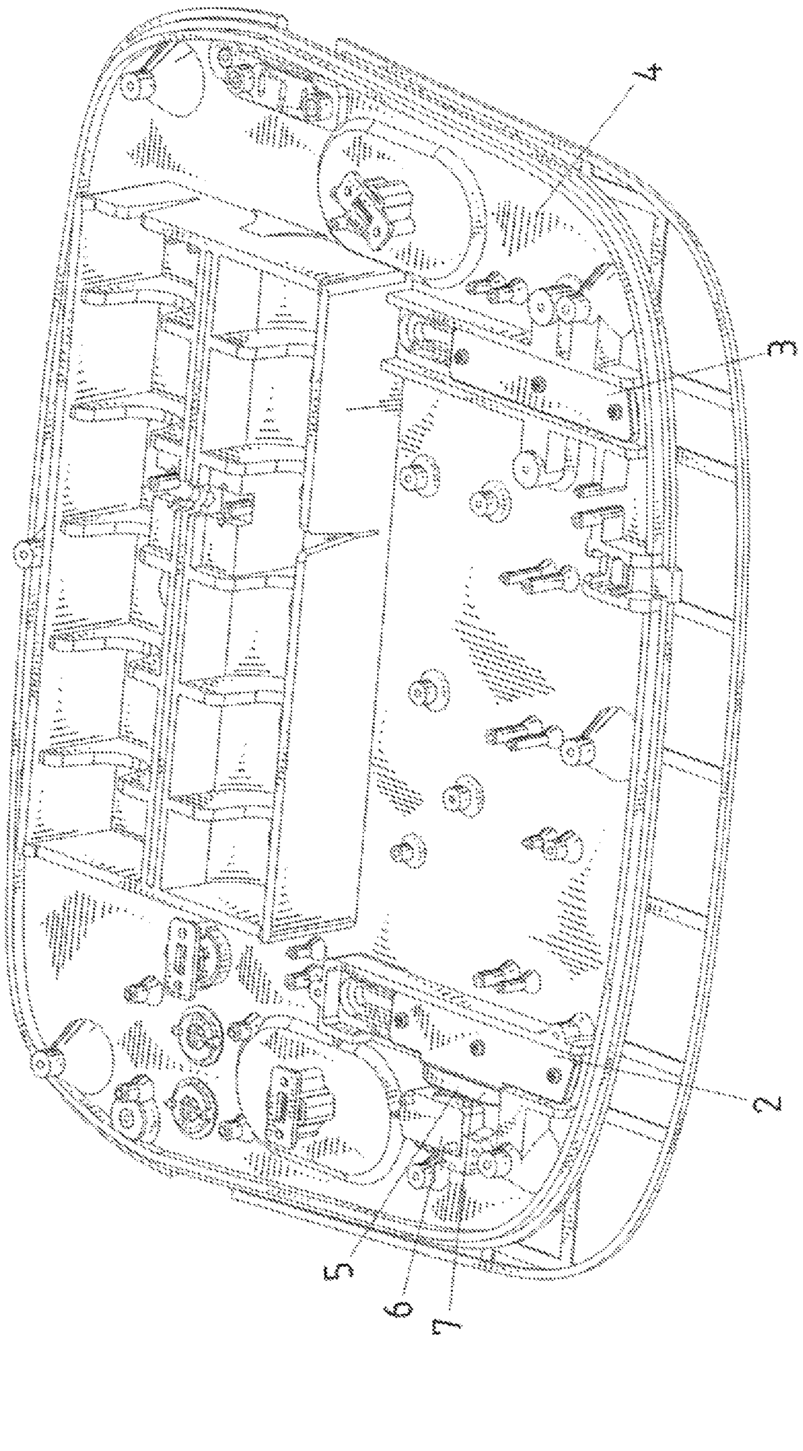
FIG. 10 shows a bottom schematic view of the present invention when face cover that is pushed open.

Referring to FIGS. 3 to 5, it shows a paper shredder of the present invention which comprises a face cover 1. The face cover 1 is disposed on an upper end surface of an upper cover 4 of the paper shredder. A side of an opening of the upper cover 4 of the paper shredder is disposed with fixing boards and the face cover 1 is disposed on a same level as the fixing boards. A left and right side of the face cover 1 is provided respectively with an indented circular groove 27 which is disposed close to the fixing boards. A left and right side at a bottom of the upper cover 4 is provided longitudinally with a first chute 15 and a second chute 21. The first chute 15 and the second chute 21 are long slots; a front and rear side of the chutes are a round arc. A chute wall on a side opposite to the rear side of the first chute 15 and the second chute 21 is provided with an elastic wall 16. A lower end of the first chute 15 is provided with a third chute 22 and the third chute 22 is wider than the first chute 15. The third chute 22 is also a long slot; a front and rear side of the third chute 22 are a round arc. A lower end of the third chute 22 is provided with a fifth chute 24 and the fifth chute 24 is wider than the third chute 22. A left side of the fifth chute 24 is opened with a limiting slot 26. The first chute 15, the third chute 22 and the fifth chute 24 form a staircase mechanism. A lower end of the second chute 21 is provided with a fourth chute 23 and the fourth chute 23 is wider than the second chute 21. A lower end of the fourth chute 23 is provided with a sixth chute 25 and the sixth chute 25 is wider than the fourth chute 23. The second chute 21 and the fourth chute 23 are a long slot; a front and rear side of the second and fourth chute are a round arc. The second chute 21, the fourth chute 23 and the sixth chute 25 form a staircase mechanism. The first chute 15 and the second chute 21 are equal in shape and size. The third chute 22 and the fourth chute 23 are equal in shape and size. The fifth chute 24 and the sixth chute 25 are equal in shape and size. A right side of the first chute 15 (i.e., a left side of the first chute 15 in FIG. 5 and an exterior side of the upper cover 4) is provided with a micro-switch 6. An interior of the first chute 15 and the second chute 21 is provided with guiding pillars 13. The guiding pillars 13 are connected and fixed on a lower end surface of the face cover 1. There are three guiding pillars 13 at each side, aligned in a straight line along the first chute 15 and the second chute 21, respectively. The guiding pillars 13 in the first chute 15 and the second chute 21 are provided with a first pressing plate 2 and a second pressing plate 3 which are connected through screws. The first pressing plate 2 and the second pressing plate 3 are a rectangular strip and are disposed respectively in the fifth chute 24 and the sixth chute 25. The first pressing plate 2 is provided with an extension arm 5 disposed between the micro-switch 6 and the fifth chute 24. The extension arm 5 moves in the limiting slot 26 and when the face cover 1 is pushed, the face cover 1 will drive the guiding pillars 13 to slide in the first chute 15 and the second chute 21; whereas, the guide pillars 13 will drive the first pressing plate 2 and the second pressing plate 3 to move together. When the extension arm 5 moves to a front end of the limiting slot 26, the extension arm 5 will be in touch with a spring leaf 7 of the micro-switch 6, and referring to FIG. 10 and FIG. 11, the spring leaf 7 will be compressed to energize the micro-switch 6 and ignite an indication light 9 (FIG. 9).

Figure 6:
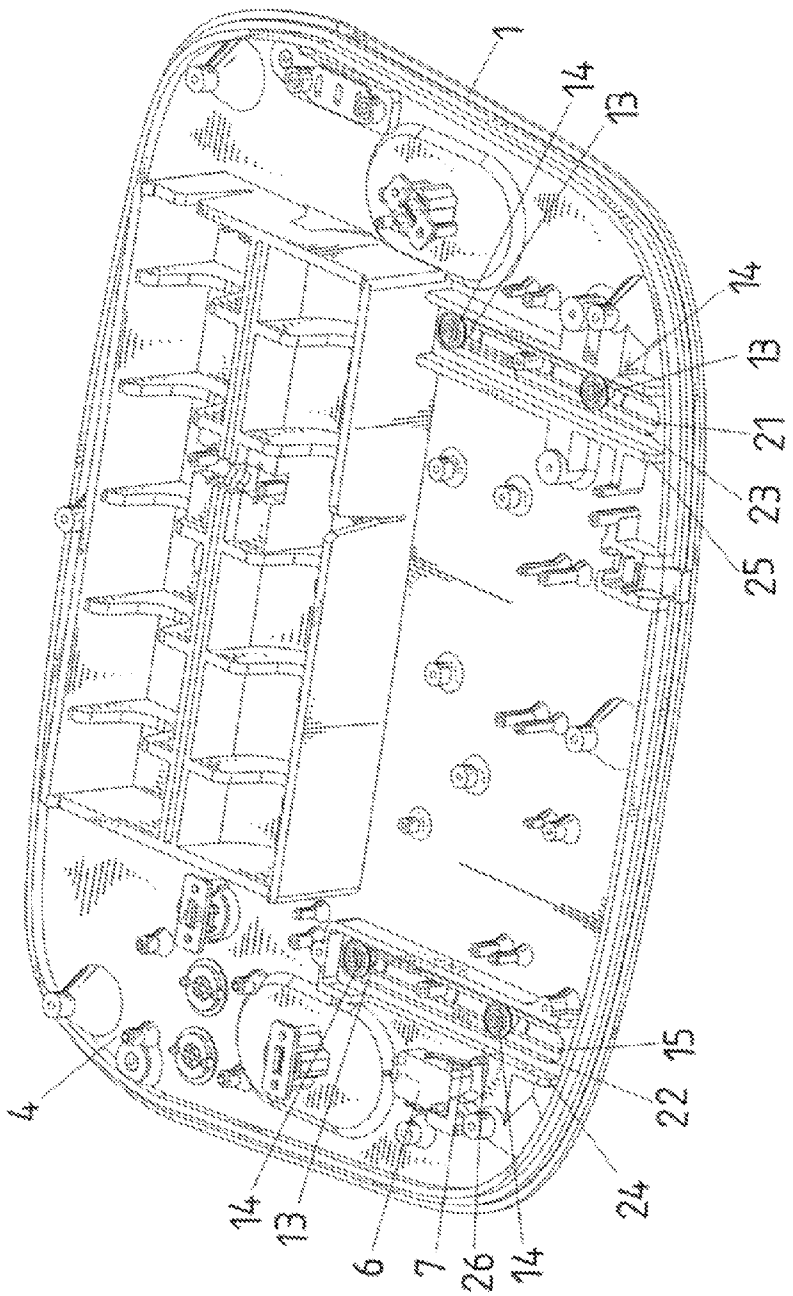
FIG. 6 shows a bottom schematic view of a third embodiment of the present invention.
Figure 7:
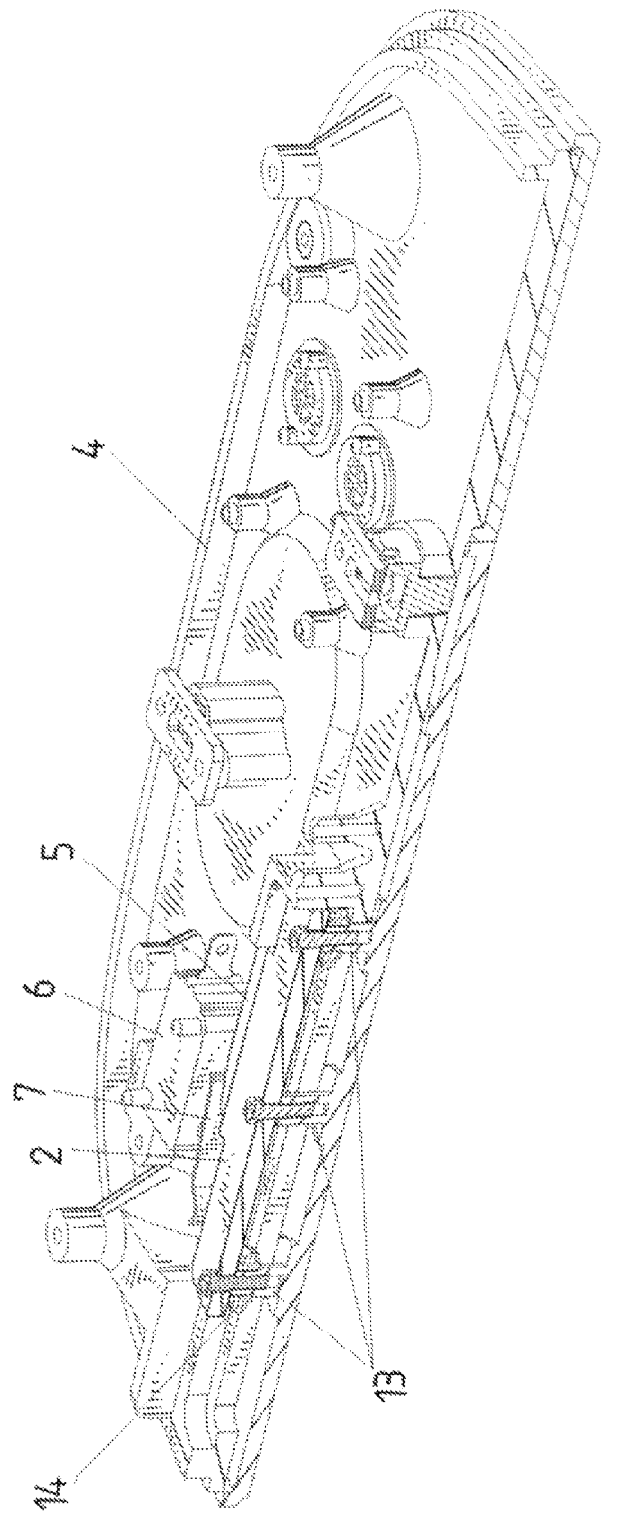
FIG. 7 shows a partial cross-sectional view of an embodiment of FIG. 6.

Referring to FIG. 6 and FIG. 7, the front and rear guiding pillars 13 are connected with pulleys 14, the pulleys 14 are disposed in the third chute 22 and the fourth chute 23 and two sides of the pulleys 14 are in touch with the chute walls of the third chute 22 and the fourth chute 23.

Figure 8:
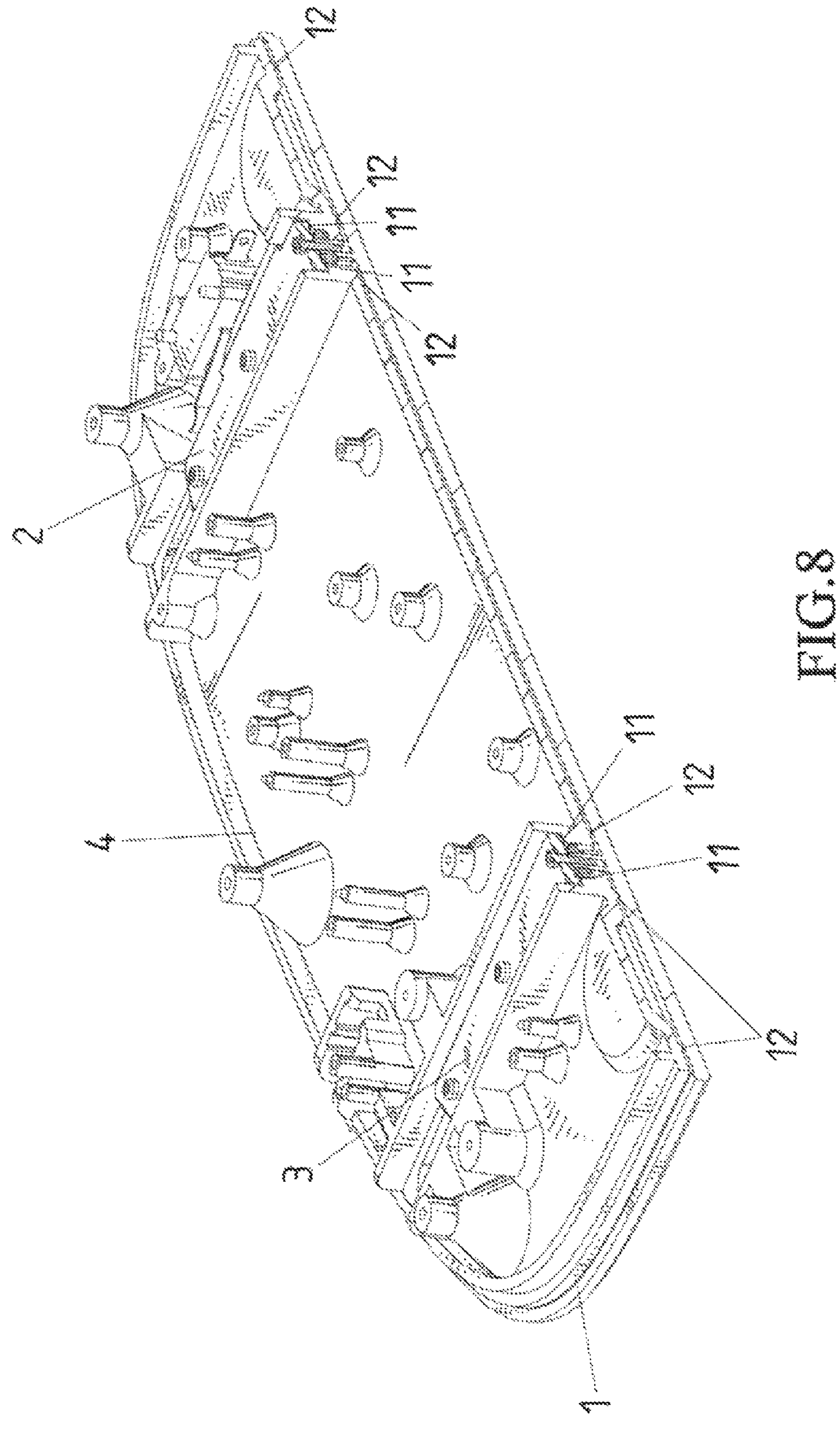
FIG. 8 shows a partial cross-sectional view of another embodiment of FIG. 6.

Referring to FIG. 8, to guarantee that the face cover 1 can move front and back smoothly, a left and right side of the upper end surface of the upper cover 4 are provided longitudinally with three first bars 12. The first bars 12 are disposed at a left and right side of the circular grooves 27 and interior sides of the first chute 15 and the second chute 21. An upper end surface of the first bar 12 is in contact with a lower end surface of the face cover 1. Two sides of an upper end surface of the first pressing plate 2 and the second pressing plate 3 are provided longitudinally with second bars 11. An upper end surface of the second bar 11 is in contact with a lower end surface of the fifth chute 24 and the sixth chute 25.

Figure 11:
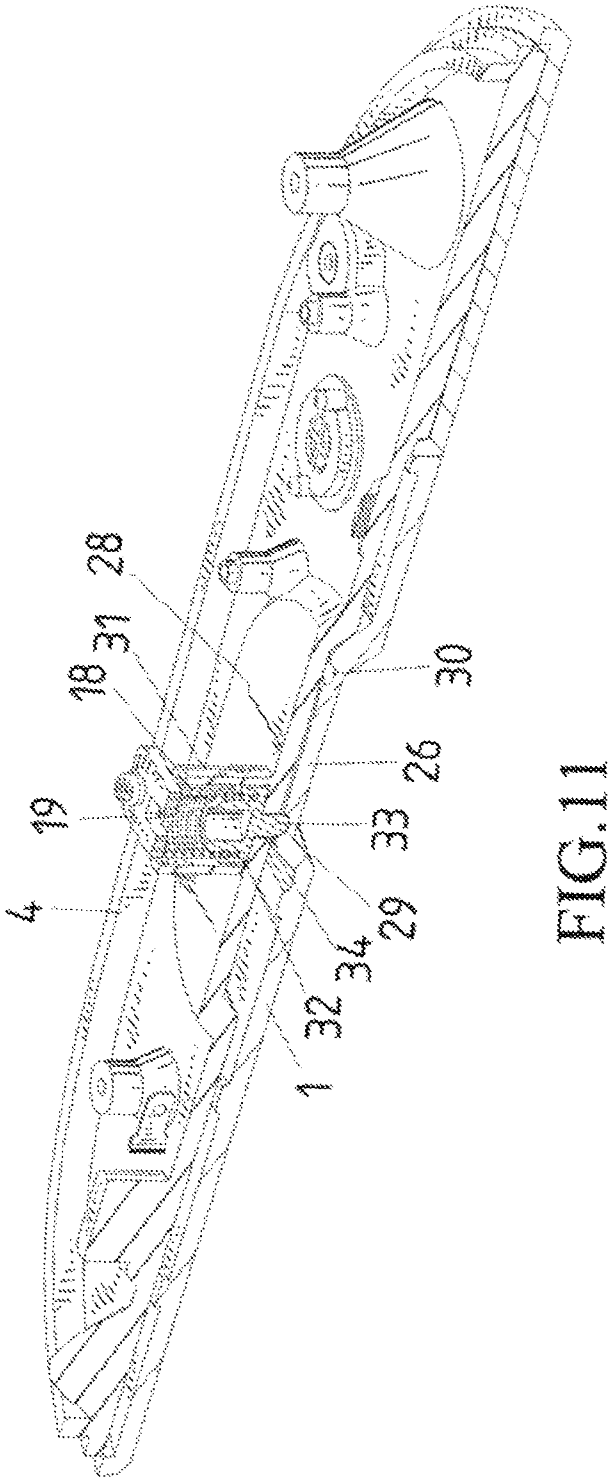
FIG. 11 shows a schematic view of an elastic pin mechanism of the present invention.

Referring to FIG. 11, to guarantee a sense of touch, a lower end of the circular groove 27 and on the upper cover 4 is provided with a seventh chute 28. The circular groove 27 moves inside the seventh chute 28 and an elastic pin mechanism is provided between the circular groove 27 and the seventh chute 28. The elastic pin mechanism is formed by an elastic pin seat 31, a locating pin 32, a spring 18 and a third pressing plate 19. The elastic pin seat 31 is disposed in a middle of the seventh chute 28, and a hole 34 is opened on the elastic pin seat 31 and the seventh chute 28. An upper end of the locating pin 32 is provided with a stand column 33 which extends out of the hole 34. An upper end of the stand column 33 is provided with a spherical surface and a lower end of the circular groove 27 is provided longitudinally with a first locating slot 29 and a second locating slot 30. The first locating slot 29 and the second locating slot 30 are a round recession and are disposed at a front and rear end in a middle of the circular grooves 27, at a same position of the stand column 33. The spring 18 is disposed in the elastic pin seat 31 and the third pressing plate 19 is connected and fixed at a bottom of the elastic pin seat 31 through screws. A side of the spring 18 abuts on an upper end surface of the third pressing plate 19 and the other side is sheathed at a lower end of the locating pin 32.

In an idle state, the face cover 1 is closed. At this time, the rear guiding pillars 13 are subjected to an elastic force of the elastic wall 16, so that they are tightened at the rear sides of the first chute 15 and the second chute 21. Whereas, the stand column 33 on the locating pin 32 abuts in the first locating slot 29 and the micro-switch 6 is not touched. Therefore, the paper shredder is powered off. On the other hand, when the face cover 1 is pushed open, the spherical surface at the upper end of the stand column 33 will slide out along the first locating slot 29, allowing the locating pin 32 to compress the spring 18 and to tightly depress the stand column 33 at a same time. Therefore, the stand column 33 will abut on a lower end surface of the circular groove 27 and move toward the second locating slot 30 at a same time. In addition, the face cover 1 will also drive the guiding pillars 13 to move, and the rear guiding pillars 13 will slide into the elastic wall 16. At this time, the elastic wall 16 will tightly depress the rear guiding pillars 13, so that the rear guiding pillars 13 can slide inside the first chute 15 and the second chute 21 to guarantee the sense of touch. In a mean time, the guiding pillars 13 also drive the first pressing plate 2 and the second pressing plate 3 to move toward a front end. When the extension arm 5 reaches to a front end of the limiting slot 26, the extension arm 5 cannot move further, the stand column 33 has also moved into the second locating slot 30, with that the spherical surface allows the stand column 33 to enter into the second locating slot 30. In addition, the spring 18 extends to tightly abut the stand column 33 in the second locating slot 30. The extension arm 5 is also in touch with the spring leaf 7 of the micro-switch 6, and the micro-switch 6 is activated. Therefore, the paper shredder is energized, the indication light 9 is ignited and the paper shredder is operating.

Conclusively, in the present invention, the paper entrance is closed when the paper shredder is not in use. Therefore, the paper shredder is neat and beautiful in appearance and is also powered off, which saves energy and is environmental benign. When the paper shredder is to be used, on the other hand, the face cover 1 is only pushed back gently and then the paper entrance will reveal and the power will be on, which prevents from hurting people and damaging the paper shredder itself.

It is of course to be understood that the embodiments described herein is merely illustrative of the principles of the invention and that a wide variety of modifications thereto may be effected by persons skilled in the to art without departing from the spirit and scope of the invention as set forth in the following claims.

What is claimed is:

1. A slidable cover mechanism of a paper shredder, wherein an upper cover of a paper shredder is provided with a face cover sliding along an upper surface of the upper cover, two sides at a bottom of the upper cover are provided respectively with a first chute and a second chute, two sides at a bottom of the face cover are provided with guiding pillars disposed at locations corresponding to the first chute and the second chute and extending through said first chute and second chute, the guiding pillars are disposed respectively in the first chute and the second chute, a first pressing plate and a second pressing plate are connected respectively above the first chute and the second chute on the guiding pillars, an exterior side of the first chute is provided with a micro-switch at a bottom of the upper cover, and an extension arm is provided between a side of the first pressing plate and the micro-switch; when the face cover is pushed open along the upper surface of the upper cover, the extension arm is in touch with a spring leaf on the micro-switch and the micro-switch is energized; when the face cover is closed along the upper surface of the upper cover, the extension arm is not in touch with the spring leaf on the micro-switch and the micro-switch is off.

2. The slidable cover mechanism of a paper shredder according to claim 1, wherein a lower end of the first chute and the second chute is provided respectively with a third chute and a fourth chute that are wider than the first chute and the second chute, a lower end of the third chute and the fourth chute are provided respectively with a fifth chute and a sixth chute that position a first pressing plate and a second pressing plate, a side of the fifth chute is provided with a limiting slot between the fifth chute and the micro-switch, the first pressing plate is disposed in the fifth chute, the extension arm is disposed in the limiting slot, and the second pressing plate is disposed in the sixth chute.

3. The slidable cover mechanism of a paper shredder according to claim 1, wherein there are three guiding pillars in the first chute and the second chute, respectively.

4. The slidable cover mechanism of a paper shredder according to claim 3, wherein the guiding pillars are provided with pulleys which are disposed in a third chute and a fourth chute, respectively.

5. The slidable cover mechanism of a paper shredder according to claim 1, wherein an upper end surface of the upper cover of the paper shredder is provided with first bars and an upper end surface of the first bar is in contact with a lower end surface of the face cover.

6. The slidable cover mechanism of a paper shredder according to claim 1, wherein an upper end surface of the first pressing plate and an upper end surface of the second pressing plate are provided with a second bar respectively, and an upper end surface of the second bar is in touch with a lower end surface of the fifth chute and a lower end surface of the sixth chute respectively.

7. The slidable cover mechanism of a paper shredder according to claim 1, wherein a chute wall on an interior side of the first chute and the second chute is provided respectively with an elastic wall and when the guiding pillars slide to the elastic wall, the elastic wall is in touch with an outer surface of the guiding pillars.

8. The slidable cover mechanism of a paper shredder according to claim 1, wherein two sides of an upper end surface of the face cover are provided respectively with an indented circular groove.

9. The slidable cover mechanism of a paper shredder according to claim 1, wherein a middle of the upper cover of the paper shredder is provided with a seventh chute corresponding to a circular groove, the circular groove is disposed in the seventh chute, and the seventh chute is provided with an elastic pin mechanism.

10. The slidable cover mechanism of a paper shredder according to claim 9, wherein the elastic pin mechanism is formed by a first locating slot and a second locating slot disposed at a front and rear side of a bottom of the circular groove, an elastic pin seat disposed at a bottom of the seventh chute, a locating pin disposed in the elastic pin seat, and a spring disposed in the elastic pin seat from below; an upper end of the locating pin is provided with a stand column having a spherical surface, the stand column is extended out of a hole in the elastic pin seat and is abutted in the first locating slot and the second locating slot, a lower end of the elastic pin seat is provided with a third pressing plate which is connected and fixed on the elastic pin seat through screws, an upper end of the spring is sheathed at a rear end of the locating pin, and a lower end of the spring is abutted on an upper end surface of the third pressing plate.

* * * * *